(12) United States Patent
Lam et al.

(10) Patent No.: US 11,113,391 B2
(45) Date of Patent: Sep. 7, 2021

(54) METHOD AND COMPUTER SYSTEM FOR PREVENTING MALICIOUS SOFTWARE FROM ATTACKING FILES OF THE COMPUTER SYSTEM AND CORRESPONDING NON-TRANSITORY COMPUTER READABLE STORAGE MEDIUM

(71) Applicant: INDUSTRIAL TECHNOLOGY RESEARCH INSTITUTE, Hsinchu (TW)

(72) Inventors: Lap Chung Lam, Stony Brook, NY (US); Pan-Jo Chuang, Kaohsiung (TW); Li-Ting Huang, Hsinchu (TW); Tzy-Shiah Wang, Tainan (TW); Chuan-Yu Cho, Hsinchu (TW); Tzi-Cker Chiueh, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 403 days.

(21) Appl. No.: 16/356,880

(22) Filed: Mar. 18, 2019

(65) Prior Publication Data
US 2020/0125723 A1    Apr. 23, 2020

(30) Foreign Application Priority Data
Oct. 23, 2018    (TW) .................. 107137386

(51) Int. Cl.
*G06F 21/00* (2013.01)
*G06F 21/54* (2013.01)

(52) U.S. Cl.
CPC ........ *G06F 21/54* (2013.01); *G06F 2221/034* (2013.01)

(58) Field of Classification Search
None
See application file for complete search history.

(56) References Cited

U.S. PATENT DOCUMENTS 7,814,554 B1 * 10/2010 Ragner .................. G06F 21/52
726/27
9,317,686 B1    4/2016 Ye et al.
(Continued)

FOREIGN PATENT DOCUMENTS

CN     101231682 A     7/2008
CN     106951781 A     7/2017
(Continued)

OTHER PUBLICATIONS

Kim, Danny et al. A Hybrid Static Tool to Increase the Usability and Scalability of Dynamic Detection of Malware. 2018 13th International Conference on Malicious and Unwanted Software (MALWARE). https://ieeexplore.ieee.org/stamp/stamp.jsp?tp=&arnumber=8659373 (Year: 2018).*
(Continued)

*Primary Examiner* — Jeremiah L Avery
(74) *Attorney, Agent, or Firm* — Birch, Stewart, Kolasch & Birch LLP

(57) ABSTRACT

A method for preventing malicious software from attacking files of a computer system includes the following steps. Whether a file type of a specific file corresponding to an input/output (I/O) request is a to-be-backed-up file type is checked, wherein the to-be-backed-up file type belongs to
(Continued)

one of multiple predetermined file types susceptible to malicious software attack. When the file type of the specific file is the to-be-backed-up file type, a backup already tag in a file context tag structure of the specific file is checked. When the backup already tag shows that the specific file has not been backed up, a backup process is performed for the specific file.

19 Claims, 4 Drawing Sheets

(56) References Cited

U.S. PATENT DOCUMENTS

| | | | |
|---|---|---|---|
| 10,867,040 B2* | 12/2020 | Gibbons, Jr. | G06F 21/565 |
| 2016/0378988 A1 | 12/2016 | Bhashkar et al. | |
| 2017/0177867 A1* | 6/2017 | Crofton | G06F 21/565 |
| 2018/0146009 A1 | 5/2018 | Primm | |
| 2019/0318100 A1* | 10/2019 | Bhatia | H04L 63/1425 |
| 2019/0332766 A1* | 10/2019 | Guri | G06F 21/566 |
| 2020/0125723 A1* | 4/2020 | Lam | G06F 21/54 |

FOREIGN PATENT DOCUMENTS

| | | |
|---|---|---|
| CN | 107506642 A | 12/2017 |
| TW | 201118642 A1 | 6/2011 |
| TW | 201814577 A | 4/2018 |

OTHER PUBLICATIONS

Kharraz, Amin et al. Protecting against Ransomware: A New Line of Research or Restating Classic Ideas? IEEE Security & Privacy, vol. 16, Issue: 3. https://ieeexplore.ieee.org/stamp/stamp.jsp?tp=&arnumber=8395120 (Year: 2018).*

Ahmadian et al., "Connection-Monitor & Connection-Breaker: A Novel Approach for Prevention and Detection of High Survivable Ransomwares", 2015 IEEE, pp. 79-84.

Continella et al., "ShieldFS: A self-healing, Ransomware-aware Filesystem", ACSAC '16, Dec. 5-9, 2016, Los Angeles, CA, USA, 2016 ACM. ISBN 978-1-4503-4771-6/16/12, total of 12 pages.

Kharaz et al., "UNVEIL: A Large-Scale, Automated Approach to Detecting Ransomware", USENIX Association, 25th USENIX Security Symposium, pp. 757-772.

Kharraz et al., "Cutting the Gordian Knot: A Look Under the Hood of Ransomware Attacks", Springer International Publishing Switzerland 2015, M. Almgren et al.(Eds.): DIMVA 2015, LNCS 9148, pp. 3-24, 2015.

Kim et al., "Design of Quantification Model for Ransom Ware Prevent", World Journal of Engineering and Technology, 2015, 3, pp. 203-207, Published Online Oct. 2015 in SciRes. http://www.scirp.org/journal/wjet, http://dx.doi.org/10.4236/wjet.2015.33C030.

Scaife et al., "CryptoLock (and Drop It): Stopping Ransomware Attacks on User Data", 2016 IEEE 36th International Conference on Distributed Computing Systems, pp. 303-312.

Taiwanese Office Action and Search Report for Taiwanese Application No. 107137386, dated Sep. 26, 2019.

* cited by examiner

METHOD AND COMPUTER SYSTEM FOR PREVENTING MALICIOUS SOFTWARE FROM ATTACKING FILES OF THE COMPUTER SYSTEM AND CORRESPONDING NON-TRANSITORY COMPUTER READABLE STORAGE MEDIUM

This application claims the benefit of Taiwan application Serial No. 107137386, filed Oct. 23, 2018, the disclosure of which is incorporated by reference herein in its entirety.

TECHNICAL FIELD

This disclosure relates to a method and a computer system for preventing malicious software from attacking files of the computer system and a corresponding non-transitory computer readable storage medium.

BACKGROUND

With the popularization of social network and cloud services, people also expose their privacy to unprotected network environments while relying on network resources and enjoying their convenience. High potential value data, such as personal privacy, personal financial information and the like, has induced a large number of offenders to steal and attack. For example, attack behaviors, such as botnet, ransomware, privacy data theft, distributed denial of service (DDoS) and advanced persistent threat (APT) and the like, are increasing day after day. The ransomware spreads quickly through e-mail, web browsing and system vulnerabilities, encrypts important data from users in infected computers to claim high ransom, and has caused a major disaster to the network world. Therefore, how to detect the attack behavior of malicious software correctly and more effectively and to protect the important data, such as documents, data or files, in the computer system to reduce the impact and harm that the files are deleted, modified, renamed or encrypted or cannot be accessed when the computer system is attached by the malicious software is a problem that needs to be solved today.

SUMMARY

According to one embodiment of this disclosure, a method for preventing malicious software from attacking files of a computer system is provided. The method includes the following steps. It is checked whether a file type of a specific file corresponding to an input/output (I/O) request is a to-be-backed-up file type, wherein the to-be-backed-up file type belongs to one of multiple predetermined file types susceptible to malicious software attack. A backup already tag in a file context tag structure of the specific file is checked when the file type of the specific file is the to-be-backed-up file type. A backup process is performed for the specific file when the backup already tag shows that the specific file has not been backed up.

According to another embodiment of this disclosure, a computer system for preventing malicious software from attacking files of a computer system is provided. The computer system includes a storage device and a processor. The storage device stores a specific file, wherein an I/O request corresponds to the specific file. The processor executes multiple instructions stored in the storage device to check whether a file type of the specific file corresponding to the I/O request is a to-be-backed-up file type. The to-be-backed-up file type belongs to one of multiple predetermined file types susceptible to malicious software attack. When the file type of the specific file is the to-be-backed-up file type, a backup already tag in a file context tag structure of the specific file is checked. A backup process for the specific file is performed when the backup already tag shows that the specific file has not been backed up.

According to an alternative embodiment of this disclosure, a non-transitory computer readable storage medium storing multiple instructions to be executed by a processor to make the computer system including the processor perform the method for preventing the malicious software from attacking the files of the computer system.

Figure 1:
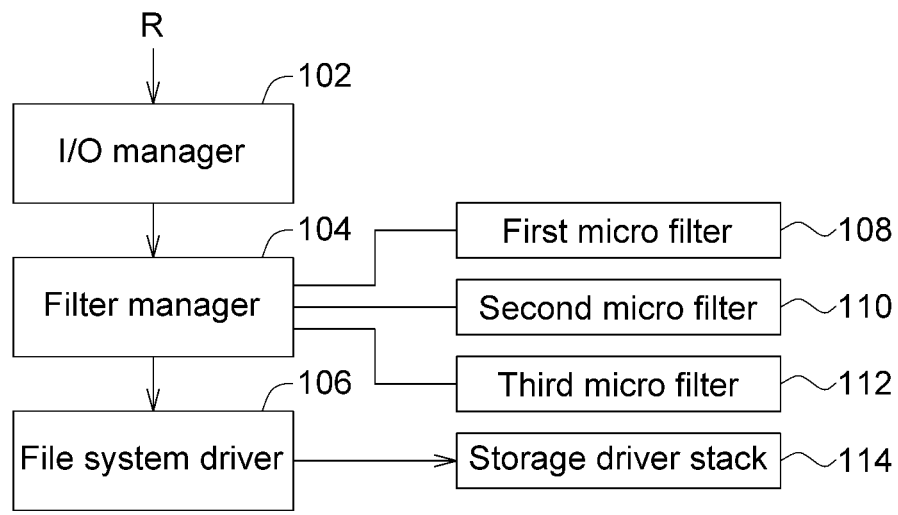
FIG. 1 is a framework diagram showing an example of a system in a kernel mode used in this embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

This disclosure provides a method for preventing malicious software from attacking files of a computer system, and the method includes the following steps. Whether a file type of a specific file corresponding to an input/output (I/O) request is a to-be-backed-up file type is checked. The to-be-backed-up file type belongs to one of multiple predetermined file types susceptible to malicious software attack. When the file type of the specific file is the to-be-backed-up file type, a "backup already tag" in a file context tag structure of the specific file is checked. When the "backup already tag" shows that the specific file has not been backed up, a backup process is performed for the specific file. The "file context" allows the driver to store a "self-defined data structure" attached in the file open period; and the file context is created after the system receives "FileOpen", and is released when the system receives "FileClose". The "backup already tag" is one of data structures self-defined by this disclosure.

Before whether the file type of the specific file corresponding to the I/O request is the to-be-backed-up file type is checked, the method further includes checking whether a file size of the specific file is greater than 0. If yes, a step of checking whether the file type of the specific file corresponding to the I/O request is the to-be-backed-up file type is performed; and if not, a new file is created when a type of the I/O request is a creating-a-file I/O request.

After the "backup already tag" in the file context tag structure of the specific file is checked, the method further includes checking an I/O attribute of the I/O request of the specific file to judge whether the I/O attribute is a secure attribute for the specific file; and enabling the backup process if not. When the I/O attribute is one of creating-a-file attribute, writing the file attribute and configuring a file information attribute, the I/O attribute is a non-secure attribute for the specific file.

After the "backup already tag" in the file context tag structure of the specific file is checked, the method may further include checking an I/O attribute of the I/O request of the specific file, and checking an extended file attribute (EA) of the specific file after judging whether the I/O attribute is a non-secure attribute for the specific file. When the extended file attribute shows a previous process of previously modifying the specific file is different from a current process corresponding to the I/O request, the backup process is enabled. The "extended file attribute" allows the program to store metadata in the files, and allows the program to associate the files with file-associated data (i.e., metadata), such as names, topics, scopes, comments, keywords and the like, which are not interpreted by the file system.

After the I/O attribute of the I/O request of the specific file is checked, the method may further include judging whether the specific file is a decoy file. If yes, a warning message indicating that the specific file may encounter virus attack is outputted.

The above-mentioned method may further include checking whether there is an input of a user when the specific file is modified, and enabling the backup process if not. The above-mentioned method may further include judging whether a file backup number of performing the backup process is greater than a characteristic threshold value. If yes, a warning message indicating that the specific file may encounter virus attack is outputted. The above-mentioned method is further explained in the following.

In order to reduce the risk that the computer system is attacked by malicious software, this disclosure uses a launch at startup function of the operating system to execute the driver by using a kernel mode at the bottom of the hardware to maintain the authority control of the computer system.

Windows operating system provides a framework of a filter manager. The filter manager is installed with the installation of the Windows operating system, and will be activated when the micro filter driver is loaded.

FIG. 1 is a framework diagram showing an example of a system in a kernel mode used in this embodiment. Referring to FIG. 1, a system 100 in the kernel mode has an I/O manager 102, a filter manager 104, a file system driver 106, a first micro filter 108, a second micro filter 110, a third micro filter 112 and a storage driver stack 114. The first micro filter 108, the second micro filter 110 and the third micro filter 112 may be implemented by a driver, for example.

The I/O manager 102 receives an I/O request R. The first micro filter 108, the second micro filter 110 and the third micro filter 112 selects the to-be-filtered I/O operation type, such as FileOpen, read and write, by registering the to-be-monitored I/O operation type at the filter manager 104. The first micro filter 108, the second micro filter 110 and the third micro filter 112 are also indirectly attached to the file system stack. That is, each hardware device has its driver stack in the core layer, the filter manager 104 is actually attached to the driver stack of the file system, and the first micro filter 108, the second micro filter 110 and the third micro filter 112 are indirectly attached to the driver stack of the file system through the filter manager 104. In a user mode, when the I/O request R (e.g., the user request for file I/O) is present, the kernel mode is entered, and the I/O request packet (IRP) corresponding to the I/O request R is transmitted to the filter manager 104 by the I/O manager 102. The above-mentioned "user request" means the I/O request for all programs from a "user layer" (or referred to as an "application layer") according to the hierarchical concept of the operating system. The I/O request packet is then assigned to the first micro filter 108, the second micro filter 110, and the third micro filter 112 by the filter manager 104. The first micro filter 108 monitors the I/O operations of the file system, the second micro filter 110 performs the anti-virus operation on the I/O operations of the file system, and the third micro filter 112 copies the I/O operations of the file system.

A specific order determined by the so-called altitude value is given to the micro filters. The altitude of the micro filter is the order that the filter manager 104 determines to call the micro filters to process the I/O requests. For example, it is assumed that the first micro filter 108 has the altitude of 365,000, the second micro filter 110 has the altitude of 325,000 and the third micro filter 112 has the altitude of 305,000. Assuming that the three micro filters have registered the same I/O operation at the filter manager 104, the filter manager 104 will call the micro filters to perform preoperation callback routines in order according to the altitudes of the three micro filters from high to low (in the order from the first to third micro filters), and forward the I/O requests to the next micro filter with the lower altitude value. When the filter manager 104 receives a message indicating that the I/O requests have been completed, the micro filters are called in the reverse order (e.g., in the order from the third to first micro filters) according to the altitude values of the micro filters to perform the postoperation callback routines. That is, the micro filter with the lower altitude value has the higher decisive authority for the I/O requests. In this disclosure, the micro filter, such as the third filter 112 with the low altitude value, is designed, installed, and loaded in the kernel mode of the computer system to provide a method for preventing malicious software from attacking files of the computer system. However, this disclosure is not limited to only the use of the micro filter with the low altitude value, and the micro filters with other altitude values may also be used.

The above-mentioned altitude value may be regarded as follows. When the micro filter requests an altitude value from an operating system (e.g., Microsoft operating system), the altitude values will be assigned according to a hierarchy defined by the operating system, and it is also convenient for applicants to self-propose the altitude values upon requesting according to the demand so that the operating system can audit the altitude values. The final modifier gets the lower altitude value, wherein the modified contexts are modified by the fewer number of micro filters, so it is more suitable for the protection to the hardware device. The micro filter with higher altitude value is more suitable for the receiving of the I/O from the application layer, more suitable for the feedback of the I/O of the application layer, and is suitable for the processing and monitoring of the user behavior. If the Microsoft operating system is taken as an example, then the above-mentioned different altitude values respectively correspond to a monitor layer, an anti-virus layer, and a replication layer. The low altitude value corresponds to the level of the replication layer.

With the above-mentioned framework of the micro filter, all I/O requests for the file storage device may be hooked in the kernel mode, and the function of controlling other hardware devices by using drivers can be possessed. The micro filter is used to terminate a process with doubts to prevent virus intrusion, for example, and the micro filter is used to scan all files in the storage device (e.g., hard drive), and to detach elements that need to be detached.

Figure 2:
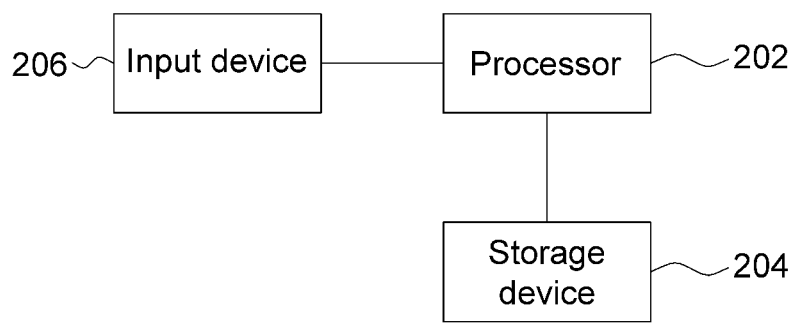
FIG. 2 is a block diagram showing a computer system used in the system framework of FIG. 1.

FIG. 2 is a block diagram showing a computer system used in the system framework of FIG. 1. Referring to FIG. 2, a computer system 200 includes a processor 202, a storage device 204 and an input device 206. The storage device 204 and the input device 206 are electrically connected to the processor 202, and are controlled by the processor 202. The I/O manager 102, the filter manager 104, the file system driver 106, the first micro filter 108, the second micro filter 110, the third micro filter 112 and the storage driver stack 114 of FIG. 1 are implemented by the processor 202 executing instructions of associated software or programs, for example. The storage device 204 is used to store at least one file and complete the instructions transferred and to be executed by the processor 202. The storage device 204 is, for example, a hard drive, a memory, a memory card, a USB storage device or the like. The input device 206 is, for example, a keyboard or mouse to be operated by the user to control the computer system 200 or to operate at least one file stored in the storage device 204.

Figure 3:
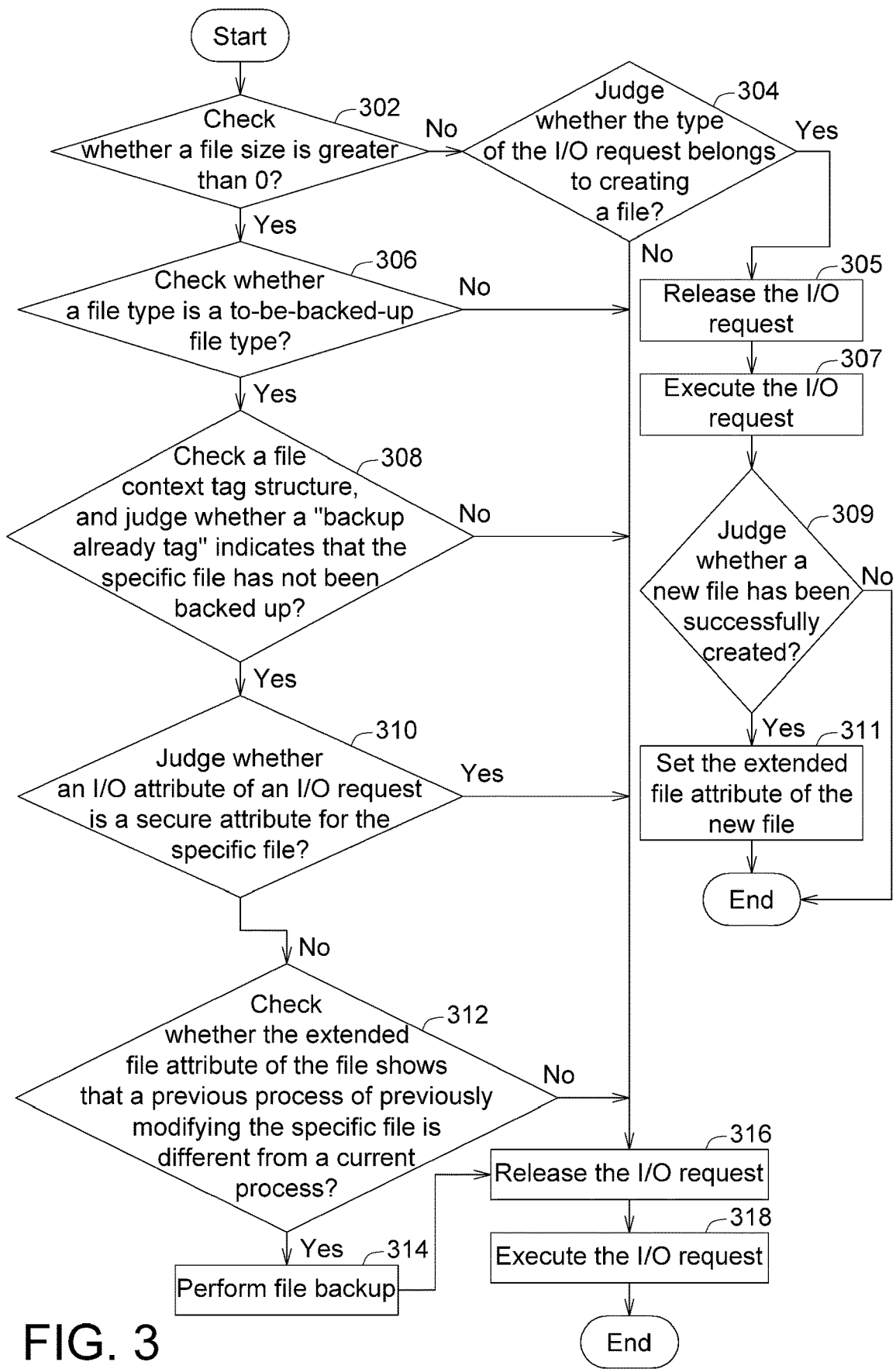
FIG. 3 is a flow chart showing a method for preventing malicious software from attacking files of the computer system in the kernel mode of the computer system according to an embodiment of this disclosure.

FIG. 3 is a flow chart showing a method for preventing malicious software from attacking files of the computer system by using the micro filter to perform preoperation callback routines in the kernel mode of the computer system according to an embodiment of this disclosure. The method shown in FIG. 3 mainly performs file backup to prevent malicious software from attacking the files of the computer system.

When the computer system 200 generates the I/O request R (e.g., the user request for file I/O), the computer system 200 enters the kernel mode. The filter manager 104 in the kernel mode will call an altitude micro filter, such as the third micro filter 112 of this disclosure, and the step shown in FIG. 3 is performed by the altitude micro filter, such as the third micro filter 112 of this disclosure, to perform the preoperation return.

When the I/O request R is generated, a step 302 is entered to check whether a file size of the specific file corresponding to the I/O request R (Check File Size) is greater than 0. If yes, a step 306 is entered. If not, a step 304 is entered to judge whether the type of the I/O request R is to create a file (IRP_MJ_CREATE). The specific file corresponding to the I/O request R represents a specific file indicated by the I/O request R to be written or read. In the case where it is judged as NO in the step 304 (i.e., the file size is 0 and the type of the I/O request is not the creating-a-file I/O request), it represents that the file backup needs not to be performed, and a step 316 is entered to directly release the I/O request R. In the case where it is judged as YES in the step 304 (i.e., if the file size is 0 and the type of the I/O request is the creating-a-file I/O request), then a step 305 is entered to release the I/O request R (i.e., to allow the I/O request R to pass through the system 100).

The released I/O request R will be executed in a step 307. For example, the I/O request R is transmitted to the storage device 204 through the filter manager 104, the file system driver 106 and the storage driver stack 114 and is executed, and whether the I/O request R returned by the storage device 204 indicates that a new file has been successfully created is monitored by the processor 202 in the subsequent operation (e.g., in the postoperation callback routines), as shown in a step 309. In the step 309, if the new file is successfully created, then an extended file attribute (EA) of the new file is further set in a step 311, and the process for sending the I/O request R currently is configured as the metadata of the creator process in the extended file attribute.

In the step 306, whether the file type of the specific file corresponding to the I/O request R is the to-be-backed-up file type is checked (Check File Type), and the to-be-backed-up file type belongs to one of multiple predetermined file types susceptible to malicious software attack. If yes, a step 308 is entered; and if not, a step 316 is entered to release the I/O request R, and the released I/O request R will be executed in a step 318. Whether the file type of the specific file is the to-be-backed-up file type may be checked by checking whether the file type is the predetermined target file type. The target file type is, for example, the file type often attacked by malicious software or the file type often modified by malicious software. The target file types can list, in the form of a list, multiple file types often attacked by malicious software and file types often modified by malicious software. For example, an extension name of the file is used to judge whether the file type is the file type often attacked by malicious software, or the file type often modified by malicious software. For instance, the ransomware often performs context modifications, renaming, encryption or the like on files whose extension names are doc, txt, xls, mpg, mp4, jpg, bmp, pdf and the like. The file types corresponding to the extension names, such as doc, txt, xls, mpg, mp4, jpg, bmp, pdf and the like, are set as the target file types. If the file type of the specific file belongs to the target file type, then the specific file is considered to be the to-be-backed-up file type. If the file type of the specific file does not belong to the target file type, then the file backup needs not to be performed and allows the I/O request R to be executed, and the steps 316 and 318 can be entered to perform the corresponding I/O operations.

In the step 308, a file context tag structure of the specific file is checked. When the file type of the specific file is judged as the to-be-backed-up file type in the step 306, a "backup already tag" in the file context tag structure of the specific file is checked, and whether the "backup already tag" is displayed as false is judged in the step 308. If the "backup already tag" is displayed as false (i.e., the judged result of step 308 is "YES"), then it represents that the specific file has not been backed up, and a step 310 is entered. If the judged result of the step 308 is false, then the step 316 is entered.

The file context tag structure is a file record (record with file) made by the micro filter for the file being opened according to requirements, and the file context tag structure is eliminated after the file is closed. The file context tag structure exists in the period when the file is opened, and in the form of a tag according to a structure customized by the micro filter program developer. For example, the file size of 100 megabytes (MB), how many of these bytes have been changed or deleted, and the like are recorded. When the file context tag structure records that the specific file belongs to a backup already file, the backup needs not to be performed, and the step 316 is directly entered to release the I/O request R. If the file context tag structure does not exist, then the specific file belongs to a newly opened file, and the file context tag structure is set for the specific file (i.e., is set for the "file size tag" and the "backup already tag" in the file context tag structure), wherein the "backup already tag" is set in advance as false. Setting the "backup already tag" can prevent the multiple I/O operations from triggering the backup mechanism to generate multiple backup files which are almost the same in the period of opening the same file.

If the context tag structure already exists or has been completely set and the "backup already tag" is false, then the step 310 is entered to check an I/O attribute of the I/O request R of the specific file to judge whether the I/O attribute is a secure attribute for the specific file. If yes, the step 316 is entered. If not, a step 312 is entered. The I/O attribute is recorded in the header of the packet of the I/O request R, and is presented in the form of a flag, for example. For example, when the I/O attribute belongs to the I/O operation without malicious doubts (i.e., when the I/O attribute is not one of the following three flags that need to be started for backup), the I/O attribute is a secure attribute for the specific file, the backup needs not to be started, and the hardware element is allowed to perform the I/O operation. If the I/O attribute includes the following three flags that need to be started for backup, then it represents that the I/O attribute is a non-secure attribute for the specific file, and the step 312 is further entered to check the extended file attribute (EA) of the file.

The above-mentioned three flags that need to be started for backup include creating-a-file (Create) attribute, writing the file (Write) attribute, and setting the file information (Set Information) attribute. Creating-a-file attribute is, for example, a flag that needs start backup when the file belongs to the Overwrite attribute, the Overwrite_If attribute and the Supersede attribute. For example, the Overwrite attribute is to perform overwrite using the given file when the file already exists. If the file does not exist, then the operation is not performed. For example, the Overwrite_If attribute is to perform overwrite by using the given file when the file already exists. If the file does not exist, then a new file is created with the given file. That is, regardless of whether the file exists, overwriting or creating the file will be performed. The Supersede attribute is to perform replacement by using the given file when the file already exists. If the file does not exist, then a new file is created with the given file.

Write attribute is the flag that needs start backup when the recorded starting byte offset tag in the context tag structure is smaller than the file size tag. Set Information attribute is the flag that needs start backup when the user deletes, renames, or replaces the file, and this belongs to setting the file information.

In the step 312, an extended file attribute (EA) of the specific file is checked. When the extended file attribute shows that a previous process of previously modifying the specific file is different form a current process corresponding to the I/O request R, the backup process is enabled and a step 314 is entered. If not, the step 316 is entered.

The extended file attribute of the file is used to reduce the backup loading of hardware. In the file structure definition, there is originally an empty area that can be utilized by the file system to let the application program fill the metadata into the file. Taking the browser (Explore) application program of Windows operating system as an example, the metadata, such as titles, subjects, tags, categories, comments and the like, may be added into the file. A new predefined value is added into the extended file attribute of the file in this disclosure. For example, the metadata of the "creator process" is used to record the process which creating this file. The metadata of the "last modifier process" may also be set in the extended file attribute data to represent the process that previously modified this file. When the metadata of the "last modifier process" of the extended file attribute shows that a previous process of previously modifying the specific file is the same as a current process corresponding to the I/O request R, the step 316 may be directly entered without performing backup. When the metadata of the "creator process" of the extended file attribute shows that a file creator of the specific file is the same as a current process corresponding to the I/O request R, the step 316 may be directly entered without performing backup also. If the metadata of the "last modifier program" does not exist in the metadata, the specific file is set, and the process for currently modifying this particular file is set as the context of the metadata of the "last modifier process" of the extended file attribute.

In the step 314, the file backup will be performed. Then, the step 316 is entered to allow the I/O request R to pass to let the I/O operation corresponding to the I/O request R be executed by the corresponding hardware. After the message showing that the file has been backed up is sent to a step 424 by, for example, the low altitude driver of the third micro filter 112 of this disclosure, the preoperation of the I/O request R returns to the filter manager 104, and then the storage device 204 receives and performs the I/O request R.

In addition, the backup folder, where the backup file is placed, itself is protected, and the operation of starting the backup mechanism cannot be performed (e.g., copying the backup file for file restoration does not affect the file context and is allowed). Therefore, in one embodiment, if any I/O request makes it necessary to back up the backup file, then the execution of the I/O request will be refused.

Figure 4A:
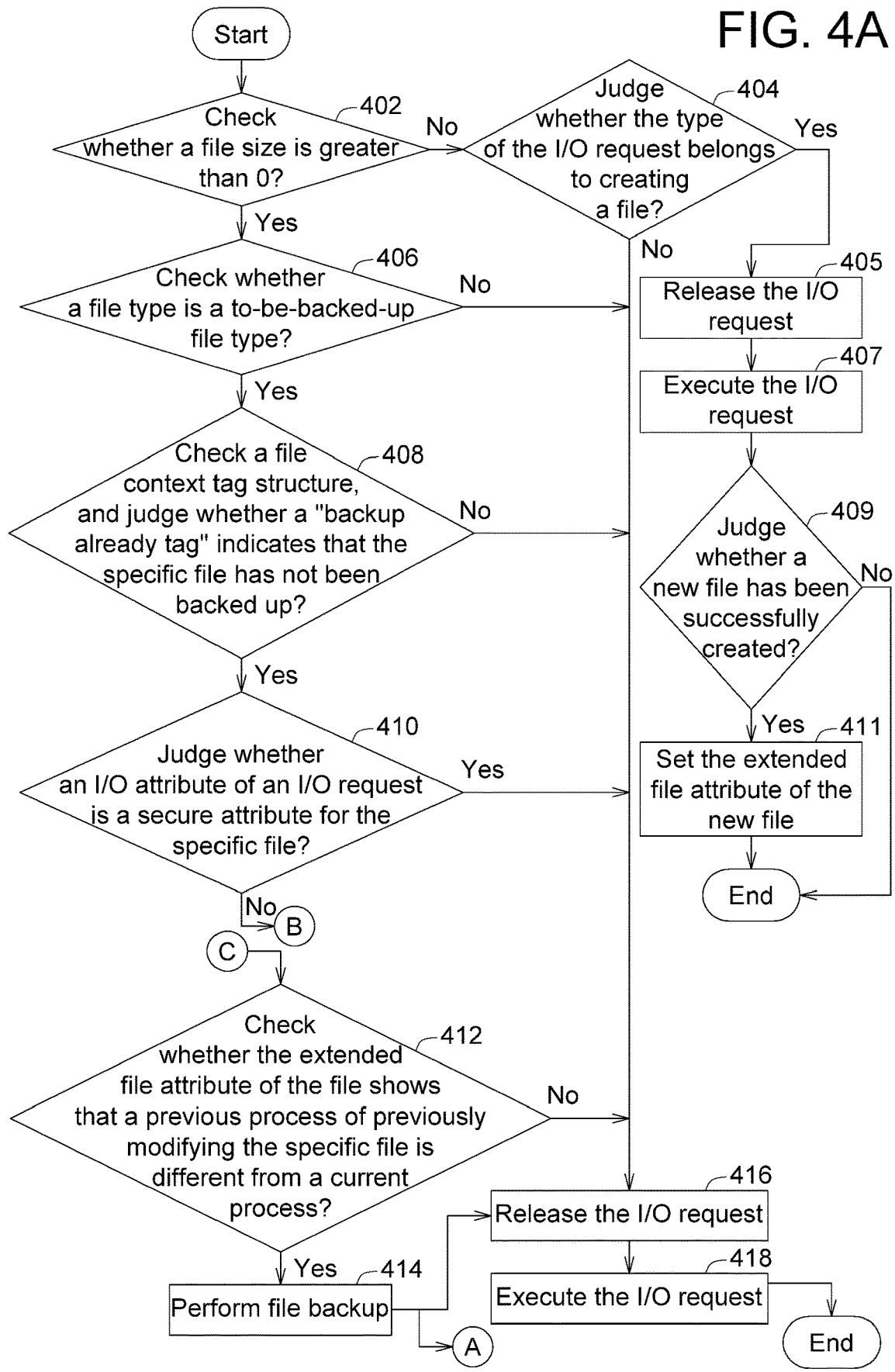
FIGS. 4A and 4B are flow charts showing a method for preventing malicious software from attacking files of a computer system according to another embodiment of this disclosure.
Figure 4B:
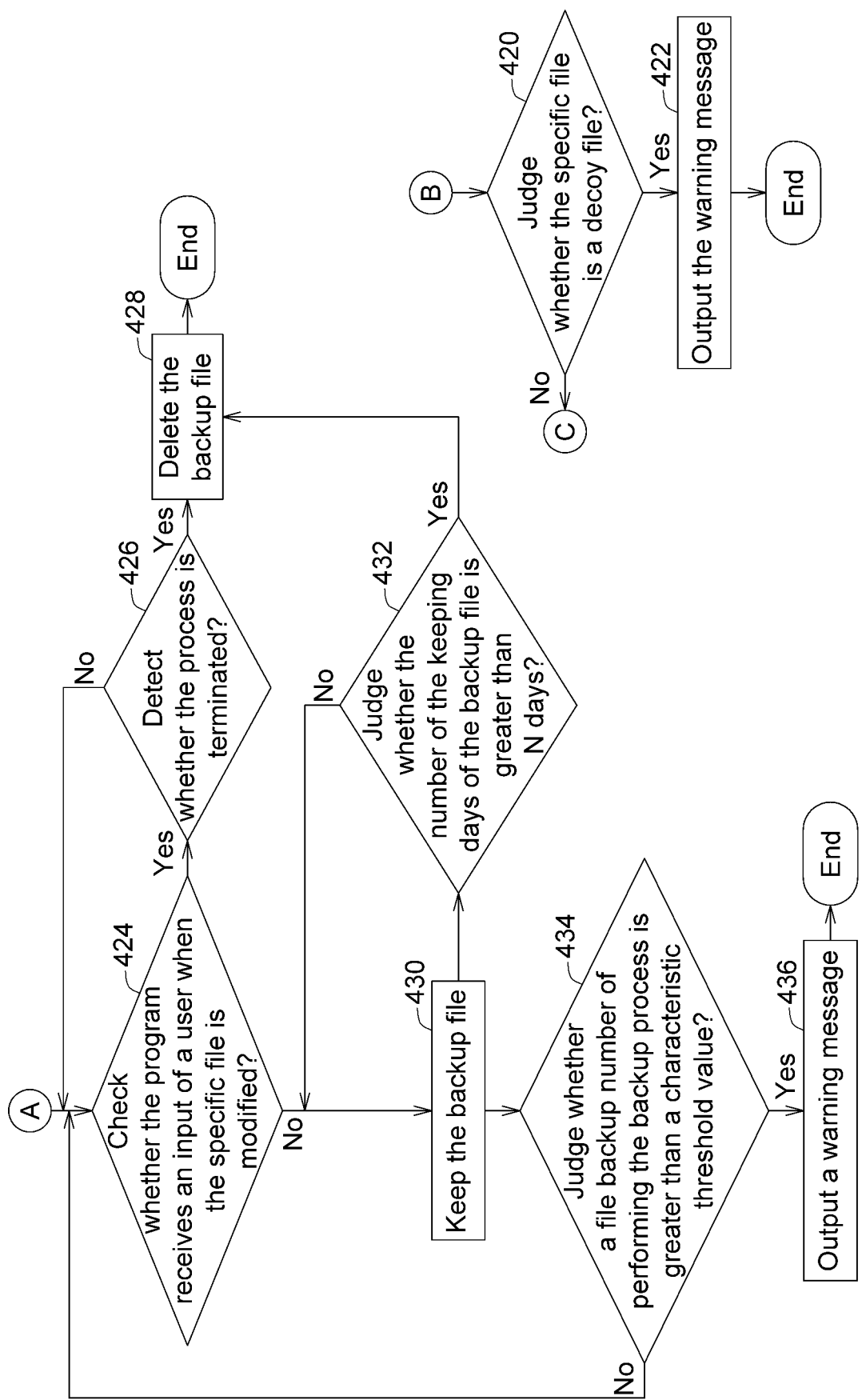

Please refer to FIGS. 4A and 4B. FIGS. 4A and 4B are flow charts showing a method for preventing malicious software from attacking files of a computer system according to another embodiment of this disclosure. The method shown in FIGS. 4A and 4B can perform the file backup and detect malicious software, and FIGS. 4A and 4B perform the file backup and add a step of detecting the malicious software with reference to FIG. 3. Steps 402 to 418 of FIGS. 4A and 4B are the same as the steps 302 to 318 of FIG. 3, and detailed descriptions thereof will be omitted. In a step 410 of checking an I/O attribute of the I/O request R of the specific file to judge whether the I/O attribute is a secure attribute for the specific file, however, when the I/O attribute of the specific file is checked to be a non-secure attribute and to be the flag that needs start backup, a step 420 may be further entered to judge whether the specific file is a decoy file. If yes, a step 422 is entered to output a warning message indicating that the specific file may encounter the virus attack and to remind the user. If not, a step 412 is entered back to the above-mentioned step of checking the extended file attribute of the file. The decoy file is a file embedded in the computer file system, is placed at a hidden and infrequently moved folder location, and is configured to be hidden. If more decoy files distributed in the file system are configured, then the rate of detecting the abnormal situations can be improved. However, the possibility that the user incorrectly deletes the decoy file and the warning message is incorrectly outputted is increased.

In addition, after the message indicating that the file has been backed up is sent by, for example, the low altitude driver of the third micro filter 112 of this disclosure in a step 414, the steps 424 to 436 may also be performed to further detect whether malicious software is being executed. In the step 424, it is checked whether the program receives an input of a user when the specific file is being modified. If not, the step 430 is entered, the backup file is kept, and malicious behavior detection and judgment are continuously performed. If yes, a step 426 is entered. In the step 424, the original process of sending the I/O request of the file backup message is detected to perform comparing and monitoring on the data of the input device 206, to judge whether the file modification is caused by the input of the user and thus to enable the backup process. For example, whether the process has an input from a mouse or a keyboard is judged. If the process has the input from the mouse or the keyboard, then the step 426 is entered to detect whether the process is terminated. If not, the process returns to the step 424. If yes, a step 428 is entered. In the step 426, if the process is not terminated, then the process continues to wait for the ending of the step 414, and then the step 424 is performed after the backup file is kept to continuously detect whether the program has the process of checking the input from the user when the backup mechanism starts. In the step 426, if all the backup processes caused by the program are caused by users when the process is terminated, then the backup file is deleted by the step 428 when the program is terminated. In the step 430 of keeping the backup file, because the backup operation has been completed in the step 414, the step 430 is the step of keeping the backup file. In addition, when the backup message of the step 414 is received at each time, the step 424 and the judgments of steps 432 and 434 are performed at the same time.

In the step 424, the backup files are distinguished based on the program. If the same program has a backup change in the step 424, but the program does not receive the input from the user, then the entire set of backups caused by the program will be backed up and kept in the step 430, so that the judgement can be performed with reference to a characteristic threshold value (malicious threshold value) in the subsequent step 434. For example, modifications from paperwork software "Word" always have an input of a user. However, one of the modified files has no user involvement, the modified file may come from the macro type of ransomware attack of the paperwork software "Word". Thus, after software of paperwork software "Word" is launched at this time, all file backups will be judged with reference to the characteristic threshold value (malicious threshold value) in the step 434 to judge whether the malicious software attack is present.

When the backup is kept in the step 430 after the step 424, if the program is detected to generate the file backup at any time in the same program without receiving the input from the user but the file is modified, then the file modifications may be caused by the malicious software. That is, the process of modifying the specific file may be executed by the malicious software. Regardless of the input of the user, all backup files caused by the program are kept, and the operations after keeping will be performed concurrently in the steps 432 and 434, respectively.

In the step 432, it is judged that the backup number caused by the suspicious process without the input of the user has not reached a characteristic threshold value (e.g., malicious threshold value), and then it is judged whether a number of keeping days of the backup files is greater than N, where N is the number of keeping days set by the user. If yes, the step 428 is entered, and the backup file is deleted. If not, the backup file is continuously kept and the process returns to the step 424 to wait for the backup success message coming from the step 414.

In the step 434, it is judged whether a file backup number of performing the backup process is greater than a characteristic threshold value (malicious threshold value). If yes, a step 436 is entered, and a warning message indicating that the specific file may be attacked by a virus is outputted. In the step 434, if the characteristic threshold value (malicious threshold value) is reached, then it may be judged as being done by the malicious software. For example, the setting of the characteristic threshold value can consider the following features for counting and evaluated with weighted coefficients to judge whether it is done by the malicious software.

First, according to the research, as the kinds of file types that are modified in a single process get more, the possibility that the files are attacked by the malicious software gets higher.

Second, the weighted counting and judging is performed according to the modification time recorded in the metadata. The possibility that the old file is attached by the malicious software when the old file is modified is higher than the possibility that the new file is attached by the malicious software when the new file is modified.

Third, the judgement is made according to the number of backup files caused, and the possibility that the files are attacked by the malicious software when a large number of files are modified is higher than the possibility that the files are attached by the malicious software when a small number of files are modified.

Fourth, the judgement is made according to the comparison information inputted by the user. The possibility that the system is attached by the malicious software when a large number of backup files are generated without the input of the user is higher than the possibility that the system is attached by the malicious software when a small number of backup files are generated without the input of the user.

That is, the judgement can be performed according to the characteristic threshold values corresponding to the following five characteristics, for example. The five characteristics include the amount of the generated backup file types, the amount of the generated backup old files, the amount of the generated backup files, the amount of the backup files caused by the input of the user, and whether the file belongs to the decoy file. These characteristics can be extracted when the backup file is generated. In addition, the first four features may be respectively given with different weighting coefficients to perform calculation, to obtain a weighted calculated value, to compare the weighted calculated value with the characteristic threshold value, and to judge whether the malicious software attack is present. Whether the specific file is the decoy file can be used independently to judge whether the malicious software attack is present.

This disclosure further provides a computer system for preventing malicious software from attacking files of the computer system. The computer system includes a storage device and a processor. The storage device stores a specific file, and an I/O request corresponds to specific file. The processor executes multiple instructions stored in the storage device to verify whether the file type of the specific file corresponding to the I/O request is a to-be-backed-up file type, wherein the to-be-backed-up file type belongs to one of multiple predetermined file types susceptible to the malicious software attack. When the file type of the specific file is the to-be-backed-up file type, a "backup already tag" in a file context tag structure of the specific file is checked. When the "backup already tag" shows that the specific file has not been backed up, a backup process is performed for the specific file. The processor is further used to perform the steps shown in FIG. 3 or FIGS. 4A and 4B.

This disclosure further provides a non-transitory computer readable storage medium, which stores multiple instructions. The instructions may be executed by the processor 202 to make the computer system 200 including the processor 202 perform the method for preventing malicious software from attacking files of the computer system as shown in FIG. 3 or FIGS. 4A and 4B.

This disclosure uses the kernel mode of the computer system to perform file backup on the I/O request for the file data, to detect whether there is an abnormal behavior belonging to the malicious software attack, and to output a warning message. For document editing files, such as the files having the extension names of doc, txt, and xls; video files having the extension names of mpg and mp4; and picture and photo files having the extension names of jpg, bmp, and the like, commonly used by users, when the data of the file is found to be modified, renamed, deleted, encrypted, the modified range of the file is judged, it is judged whether the backup has been finished, whether the I/O attribute and extended file attribute of the file belong to the file to be backed up, and whether the modification is caused by the user's normal behavior. Thus, it is monitored and analyzed whether the modification behavior of the file is caused by the malicious software attack to keep the computer system timely performing the backup system automatically under the malicious attack, and to ensure that the important data, such as files and information, cannot be destroyed. In addition, the occurrence of the attack behavior of the malicious software can be detected, so that the warning message is outputted to let the user know that the computer system might have encountered the malicious software attack as soon as possible, and the user can adopt the appropriate response operation rapidly.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for preventing malicious software from attacking files of a computer system, the method comprising:
    checking whether a file type of a specific file corresponding to an input/output (I/O) request is a to-be-backed-up file type, wherein the to-be-backed-up file type belongs to one of multiple predetermined file types susceptible to malicious software attack;
    checking a backup already tag in a file context tag structure of the specific file when the file type of the specific file is the to-be-backed-up file type; and
    performing a backup process for the specific file when the backup already tag shows that the specific file has not been backed up.

2. The method according to claim 1, further comprising:
    checking whether a file size of the specific file is greater than 0, performing a step of checking whether the file type of the specific file corresponding to the I/O request is the to-be-backed-up file type if the file size of the specific file is greater than 0, and creating a new file when a type of the I/O request is a creating-a-file I/O request if the file size of the specific file is not greater than 0,
    wherein if the new file is successfully created, then an extended file attribute of the new file is set, and a process of currently sending the I/O request is configured as metadata of a creator process in the extended file attribute.

3. The method according to claim 1, when checking the backup already tag in the file context tag structure of the specific file, further comprising:
    checking an I/O attribute of the I/O request of the specific file to judge whether the I/O attribute is a secure attribute for the specific file, and enabling the backup process if not.

4. The method according to claim 3, after checking the I/O attribute of the I/O request of the specific file, further comprising:
    judging whether the specific file is a decoy file, and outputting a warning message indicating that the specific file may encounter virus attack if yes.

5. The method according to claim 3, wherein when the I/O attribute is one of creating-a-file attribute, writing the file attribute and setting a file information attribute, the I/O attribute is a non-secure attribute for the specific file.

6. The method according to claim 1, after checking the backup already tag in the file context tag structure of the specific file, further comprising:
    checking an I/O attribute of the I/O request of the specific file; and checking an extended file attribute of the specific file after judging whether the I/O attribute is a non-secure attribute for the specific file; and
    enabling the backup process when the extended file attribute shows that a previous process of previously modifying the specific file is different from a current process corresponding to the I/O request.

7. The method according to claim 6, wherein the extended file attribute comprises metadata of a last modifier process for representing the previous process of previously modifying the specific file,
    wherein when the metadata of the last modifier process is absent from the extended file attribute, the specific file is set, and a process of currently modifying the specific file is set as a context of the metadata of the last modifier process of the extended file attribute.

8. The method according to claim 1, further comprising:
    checking whether a program has received an input of a user when the specific file is modified, and keeping a backup file if the program has not received the input of the user.

9. The method according to claim 1, further comprising:
    judging whether a file backup number of performing the backup process is greater than a characteristic threshold value, and outputting a warning message indicating that the specific file may encounter virus attack if the file backup number of performing the backup process is greater than the characteristic threshold value.

10. A computer system for preventing malicious software from attacking files of the computer system, comprising:
    a storage device storing a specific file, wherein an I/O request corresponds to the specific file; and
    a processor executing multiple instructions stored in the storage device to check whether a file type of the specific file corresponding to the I/O request is a to-be-backed-up file type, wherein the to-be-backed-up file type belongs to one of multiple predetermined file types susceptible to malicious software attack; wherein when the file type of the specific file is the to-be-backed-up file type, a backup already tag in a file context tag structure of the specific file is checked; and a backup process for the specific file is performed when the backup already tag shows that the specific file has not been backed up.

11. The computer system according to claim 10, wherein the processor further checks whether a file size of the specific file is greater than 0; whether the file type of the specific file corresponding to the I/O request is the to-be-backed-up file type is checked if the file size of the specific file is greater than 0; and a new file is created when a type of the I/O request is a creating-a-file I/O request if the file size of the specific file is not greater than 0, wherein if the new file is successfully created, then the processor further sets an extended file attribute of the new file, and a process of currently sending the I/O request is configured as metadata of a creator process in the extended file attribute.

12. The computer system according to claim 10, wherein the processor further checks an I/O attribute of the I/O request of the specific file after the backup already tag in the file context tag structure of the specific file is checked to judge whether the I/O attribute is a secure attribute for the specific file,
 wherein the processor further enables the backup process when the I/O attribute is a non-secure attribute for the specific file.

13. The computer system according to claim 12, wherein the processor further judges whether the specific file is a decoy file after the I/O attribute of the I/O request of the specific file is checked,
 wherein the processor further outputs a warning message indicating that the specific file may encounter virus attack when the specific file is the decoy file.

14. The computer system according to claim 12, wherein when the I/O attribute is one of creating-a-file attribute, writing the file attribute and configuring a file information attribute, the I/O attribute is the non-secure attribute for the specific file.

15. The computer system according to claim 10, wherein the processor further checks an I/O attribute of the I/O request of the specific file after the backup already tag in the file context tag structure of the specific file is checked, and checks an extended file attribute of the specific file after whether the I/O attribute is a non-secure attribute for the specific file is judged; and enables the backup process when the extended file attribute shows that a previous process of previously modifying the specific file is different from a current process corresponding to the I/O request.

16. The computer system according to claim 15, wherein the extended file attribute comprises metadata of a last modifier process for representing the previous process of previously modifying the specific file,
 wherein when the metadata of the last modifier process is absent from the extended file attribute, the processor further sets the specific file, and a process of currently modifying the specific file is set as a context of the metadata of the last modifier process of the extended file attribute.

17. The computer system according to claim 10, wherein the processor further checks whether a program has received an input of a user when the specific file is modified, and a backup file is kept if the input of the user is not received.

18. The computer system according to claim 10, wherein the processor further judges whether a file backup number of performing the backup process is greater than a characteristic threshold value, and outputs a warning message indicating that the specific file may encounter virus attack if the file backup number of performing the backup process is greater than the characteristic threshold value.

19. A non-transitory computer readable storage medium storing multiple instructions to be executed by a processor to make the computer system comprising the processor performing the method according to claim 1.

* * * * *